United States Patent Office.

JEREMIAH L. NEWTON, OF BOSTON, MASSACHUSETTS.

Letters Patent No. 73,919, dated January 28, 1868.

---

IMPROVED COMPOSITION FOR THE SOLES OF BOOTS AND SHOES.

---

*The Schedule referred to in these Letters Patent and making part of the same.*

---

TO ALL WHOM IT MAY CONCERN:

Be it known that I, JEREMIAH L. NEWTON, of Boston, in the county of Suffolk, and State of Massachusetts, have invented a new and useful Improvement for the Soles of Boots and Shoes; and I hereby declare that the following is a full and exact description thereof, and the same being readily understood without drawings, is submitted with the explanations herewith.

The invention consists in constructing the soles of boots and shoes, entirely or in part, with a mixture or cement, composed of caoutchouc or rubber, gutta percha, or an equivalent gum reduced to a liquid cement, and mixed with sand, pulverized quartz, emery, or an equivalent, felt, or shoddy, for the purpose of preventing slipping. Rubber boots or shoes, or rubber soles applied to boots and shoes, are very slippery on ice, when the same is wet or covered with water, as every one has experienced. To prevent slipping on the sidewalks, sand, ashes, saw-dust, and similar substances are used. By mixing sand, pulverized quartz, felt, and equivalent substances with liquid rubber cement, as commonly used in the arts, a mixture can be obtained, which, when applied to the soles of boots or shoes, in whole or in part, of whatever other material the other parts of the boots or shoes are made, will prevent slipping, operating in the same way as when sand is sprinkled upon ice to prevent slipping.

To prepare the mixture, take rubber, or an equivalent gum, and dissolve it in any of the known ways of dissolving the same, and when in the liquid state, mix, with the dissolved mass, ground quartz, &c., in quantity sufficient to make a stiff paste. Take a brush and apply the mixture while soft to the bottoms of the boots or shoes made dry or hot, and then let the same dry. A second coating may be used if necessary. It will become hard and adhere to the soles. Or take the common rubber cement, and reduce it by the addition of a little benzine, and then stir in the ground quartz, &c., and apply the mixture to the soles in the same way.

An entire sole may be made by taking the paste and spreading the same on a piece of cloth or similar substance, cutting to a suitable size, and then pressing the edges of the soles and the uppers together when plastic, or making the soles in moulds, in the usual way, of any size and thickness desirable, and then uniting them to the uppers by pressure or otherwise. The mixture can be easily removed from the cloth by benzine. In this way, soles made entirely of the mixture, or spread on the bottom of the same, become extremely serviceable, both in durability and safety in preventing slipping.

What I claim as my invention, and desire to secure by Letters Patent, is—

A mixture composed of caoutchouc or rubber, gutta percha, or an equivalent gum, mixed with pulverized quartz, sand, felt, or their equivalents, and applied to or for the soles of boots and shoes, for the purpose of preventing slipping, substantially in the manner and for the purpose above set forth.

JEREMIAH L. NEWTON.

Witnesses:
L. M. CHILD,
E. P. NETTLETON.